United States Patent
Livesey et al.

(10) Patent No.: US 9,199,555 B2
(45) Date of Patent: Dec. 1, 2015

(54) EASY ENTRY MECHANISM FOR VEHICLE SEATING

(75) Inventors: Steven Livesey, Walled Lake, MI (US); Lucas P. Porinsky, South Lyon, MI (US)

(73) Assignee: Johnson Controls Technology Company, Holland, MI (US)

( * ) Notice: Subject to any disclaimer, the term of this patent is extended or adjusted under 35 U.S.C. 154(b) by 284 days.

(21) Appl. No.: 13/816,202

(22) PCT Filed: Aug. 12, 2011

(86) PCT No.: PCT/US2011/047668
§ 371 (c)(1),
(2), (4) Date: Jul. 18, 2013

(87) PCT Pub. No.: WO2012/021855
PCT Pub. Date: Feb. 16, 2012

(65) Prior Publication Data
US 2013/0285428 A1    Oct. 31, 2013

Related U.S. Application Data

(60) Provisional application No. 61/372,994, filed on Aug. 12, 2010.

(51) Int. Cl.
*B60N 2/12* (2006.01)
*B60N 2/06* (2006.01)
*B60N 2/20* (2006.01)
*B60N 2/30* (2006.01)

(52) U.S. Cl.
CPC .. *B60N 2/12* (2013.01); *B60N 2/06* (2013.01); *B60N 2/065* (2013.01); *B60N 2/20* (2013.01); *B60N 2/3011* (2013.01); *B60N 2/3065* (2013.01)

(58) Field of Classification Search
CPC ............ B60N 2/21; B60N 2/06; B60N 2/065; B60N 2/20; B60N 2/3011; B60N 2/3065
USPC ............................... 297/325, 326, 329, 344.1
See application file for complete search history.

(56) References Cited

U.S. PATENT DOCUMENTS 1,942,998 A * 1/1934 Browne ......................... 248/393
2,100,170 A * 11/1937 Parks ............................. 297/326

(Continued)

FOREIGN PATENT DOCUMENTS

DE        20022580 U1        11/2001
EP        000120817 A1 *    10/1984

(Continued)

OTHER PUBLICATIONS

Chinese Office Action dated Oct. 11, 2014.
(Continued)

*Primary Examiner* — Milton Nelson, Jr.
(74) *Attorney, Agent, or Firm* — Fletcher Yoder, P.C.

(57) ABSTRACT

A vehicle seating system includes a seat bottom chassis, and a seat back chassis coupled to the seat bottom chassis. The vehicle seating system also includes an easy entry mechanism configured to facilitate a rotation of the seat bottom chassis and the seat back chassis about a lateral axis of the vehicle seating system. The easy entry mechanism is also configured to maintain a substantially constant angle between the seat bottom chassis and the seat back chassis during the rotation.

20 Claims, 16 Drawing Sheets

(56) References Cited

U.S. PATENT DOCUMENTS

| | | | |
|---|---|---|---|
| 4,639,038 A | 1/1987 | Heling | |
| 4,648,657 A | 3/1987 | Cox et al. | |
| 6,227,596 B1 | 5/2001 | Foucault et al. | |
| 2011/0127794 A1* | 6/2011 | Lindsay | 296/65.05 |

FOREIGN PATENT DOCUMENTS

| | | |
|---|---|---|
| FR | 2882538 A1 | 9/2006 |
| FR | 2907387 A1 | 4/2008 |
| JP | S6175027 A | 4/1986 |
| JP | H01226448 A | 9/1989 |
| JP | H02143221 U | 12/1990 |
| JP | H03118238 A | 5/1991 |
| WO | 2008012364 A1 | 1/2008 |

OTHER PUBLICATIONS

Japanese Office Action issued Oct. 22, 2014 and mailed Oct. 28, 2014.

International Search Report for application No. PCT/US2011/047668 mailed Oct. 28, 2011.

Japanese Office Action dated Mar. 27, 2014.

International Preliminary Report on Patentability dated Feb. 21, 2013.

* cited by examiner

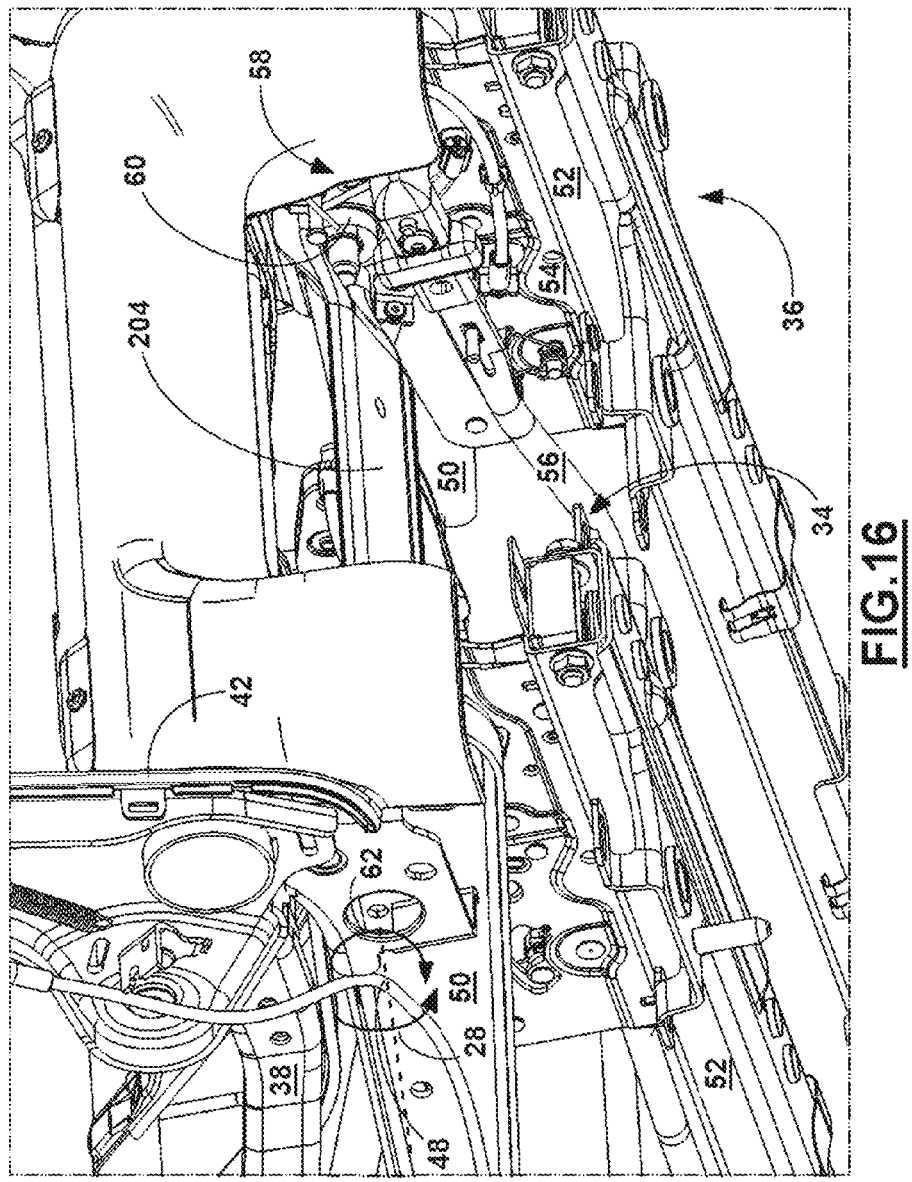

EASY ENTRY MECHANISM FOR VEHICLE SEATING

CROSS REFERENCE TO RELATED APPLICATIONS

This application claims priority from and the benefit of PCT Application No. PCT/US2011/047668, filed on Aug. 12, 2011; and U.S. Provisional Patent Application No. 61/372,994, filed on Aug. 12, 2010; both entitled "Easy Entry Mechanism for Vehicle Seating", which are herein incorporated by reference.

BACKGROUND

The invention relates generally to vehicle seating, and more specifically, to an easy entry mechanism configured to facilitate ingress and egress of vehicle passengers.

Vehicle seating typically includes a seat bottom and a seat back to support a driver or passenger. In certain seating configurations, both the seat bottom and seat back include a rigid chassis, cushions, and a fabric covering. The cushions are coupled to the rigid chassis, and the fabric covering is disposed about the assembly. The rigid chassis of the seat bottom serves to support the weight (i.e., vertical load) of the passenger, and couples the seat to a floor of the vehicle. In certain configurations, the seat bottom chassis is coupled to a carriage configured to facilitate longitudinal movement of the vehicle seating along a track. In addition, the seat back chassis may be configured to pivot relative to the seat bottom chassis to enable a passenger to adjust the seat back to a desired position.

Certain vehicle seating systems include an easy entry mechanism configured to facilitate ingress and egress of vehicle passengers. For example, if a vehicle includes three rows of seating, access to the third row may be partially blocked by a seat within the second row. Consequently, each seat within the second row may include an easy entry mechanism configured to move the second row seat, thereby providing a larger path to the third row. Upon activation, the easy entry mechanism may unlock the carriage from the track, thereby enabling the seat to slide forward. In addition, activation of the easy entry mechanism may induce the seat back to tilt forward. With the seat back tilted forward and the seat translated to a forward position, a passenger may have enhanced access to the third row of seating. Unfortunately, if a child safety seat is present within the second row seat, rotation of the seat back may be blocked, thereby significantly reducing the effectiveness of the easy entry mechanism and decreasing access to the third row.

BRIEF DESCRIPTION OF THE INVENTION

The present invention relates to a vehicle seating system including a seat bottom chassis, and a seat back chassis coupled to the seat bottom chassis. The vehicle seating system also includes an easy entry mechanism configured to facilitate a rotation of the seat bottom chassis and the seat back chassis about a lateral axis of the vehicle seating system. The easy entry mechanism is also configured to maintain a substantially constant angle between the seat bottom chassis and the seat back chassis during the rotation.

The present invention also relates to a vehicle seating system including a track oriented in a longitudinal direction. The vehicle seating system also includes a carriage engaged with the track and configured to translate along the longitudinal direction. The vehicle seating system further includes a seat structure including a seat bottom chassis and a seat back chassis. The seat structure is pivotally coupled to the carriage to facilitate rotation of the seat structure about a lateral axis relative to the carriage. Furthermore, the vehicle seating system includes a locking mechanism configured to selectively hold the seat structure in a first position relative to the carriage and to enable the seat structure to rotate between the first position and a second position relative to the carriage.

The present invention further relates to a vehicle seating system including a track oriented in a longitudinal direction and including multiple windows positioned along the longitudinal direction. The vehicle seating system also includes a carriage engaged with the track and configured to translate along the longitudinal direction. The carriage includes a pin configured to selectively engage one of the windows to block translation of the carriage relative to the track. The vehicle seating system further includes a seat structure including a seat bottom chassis and a seat back chassis. Furthermore, the vehicle seating system includes an easy entry mechanism including a pivot configured to facilitate rotation of the seat structure about a lateral axis relative to the carriage, a locking mechanism configured to selectively hold the seat structure in a first position relative to the carriage and to enable the seat structure to rotate between the first position and a second position relative to the carriage when the locking mechanism is released, and a cam configured to drive the pin out of the window when the seat structure is rotated to the second position.

DRAWINGS

FIG. 16 is a perspective view of a portion of an exemplary seat structure including an embodiment of a stabilizing support.

DETAILED DESCRIPTION

Figure 1:
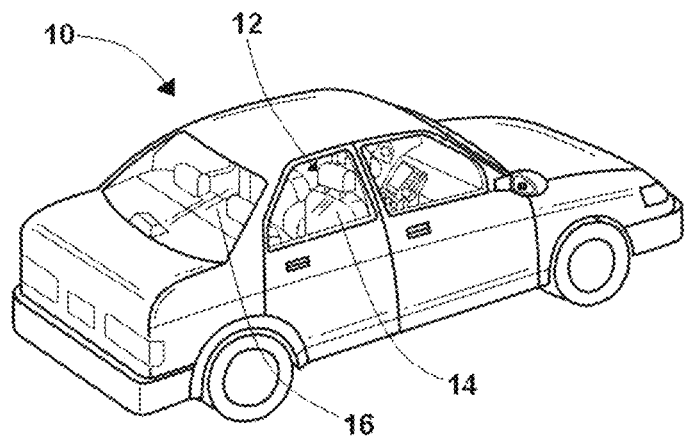
FIG. 1 is a perspective view of an exemplary vehicle that may include seating having an easy entry mechanism configured to facilitate ingress and egress of vehicle passengers.

FIG. 1 is a perspective view of an exemplary vehicle 10 including seating having an easy entry mechanism configured to facilitate ingress and egress of vehicle passengers. As illustrated, the vehicle 10 includes an interior 12 having a front row seat 14 and a rear row seat 16. As discussed in detail below, the front row seat 14 may include an easy entry mechanism configured to facilitate access to the rear row seat 16. For example, in certain embodiments, each front row seat 14 includes a seat bottom chassis, and a seat back chassis coupled to the seat bottom chassis. The seat 14 also includes an easy entry mechanism configured to facilitate a rotation of the seat bottom chassis and the seat back chassis about a lateral axis of the vehicle 10. The easy entry mechanism is also configured to maintain a substantially constant angle between the seat bottom chassis and the seat back chassis during the rotation. In such a configuration, the front row seat 14 may be tilted forward to facilitate access to the rear row seat 16, even when a child safety seat is present within the front row seat 14. In addition, certain embodiments of the easy entry mechanism may be configured to facilitate a longitudinal translation of the front row seat 14 along a track. For example, rotation of the front row seat 14 may drive a pin to disengage a window of the track, thereby enabling the seat 14 to translate in a longitudinally forward direction. The combination of forward tilting and forward movement of the front row seat 14 may facilitate ingress and egress of rear row passengers despite the presence of a child safety seat in the front row seat 14.

Figure 2:
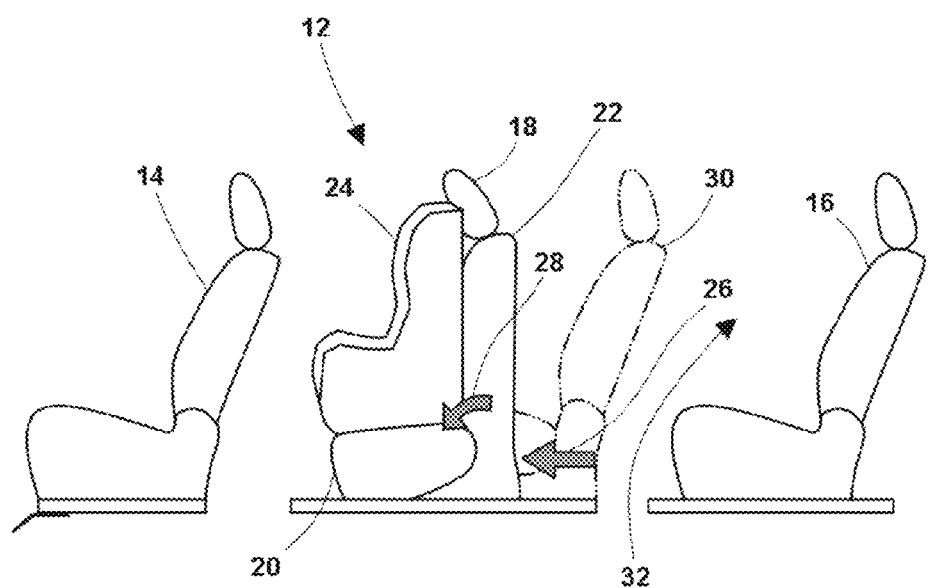
FIG. 2 is a side view of a vehicle interior having three rows of seating, in which a seat within the second row includes an easy entry mechanism.

FIG. 2 is a side view of the vehicle interior 12 having three rows of seating, in which a seat within the second row includes an easy entry mechanism. In the illustrated configuration, the vehicle interior 12 includes a second row seat 18 positioned between the front row seat 14 and the rear row seat 16. As will be appreciated, alternative vehicle interiors 12 may include more or fewer seating rows. For example, certain vehicles 10 may include 1, 2, 3, 4, 5, 6, or more rows of seating. In the present embodiment, the second row seat 18 includes a seat bottom 20 and a seat back 22. In certain configurations, the easy entry mechanism is configured to tilt the seat back 22 forward relative to the seat bottom 20 to facilitate access to the rear row seat 16. Unfortunately, if a child safety seat 24 is present within the second row seat 18, rotation of the seat back 22 may be blocked, thereby significantly reducing the effectiveness of the easy entry mechanism and decreasing access to the third row seat 16. Consequently, the present embodiment employs an easy entry mechanism configured to tilt the second row seat 18 forward while substantially maintaining an angle between the seat back 22 and the seat bottom 20.

As illustrated, the second row seat 18 is configured to translate in a longitudinal direction 26 and to rotate in a forward direction 28 from an initial position 30 to the illustrated position. For example, to access the rear row seat 16, a vehicle passenger may activate a release mechanism on the second row seat 18, thereby enabling the second row seat 18 to translate in the direction 26 and to rotate in the direction 28.

As a result, the size of an area 32 between the second row seat 18 and the third row seat 16 will increase, thereby facilitating access to the third row seat 16. Furthermore, because the angle between the seat back 22 and the seat bottom 20 is substantially maintained as the seat 18 rotates, the easy entry mechanism may enhance access to the rear row seat 16 despite the presence of the child safety seat 24. Once the passenger has entered the rear row seat 16, the seat 18 may be rotated and translated back to the initial position 30, thereby facilitating passenger comfort within the second row seat 18.

Figure 3:
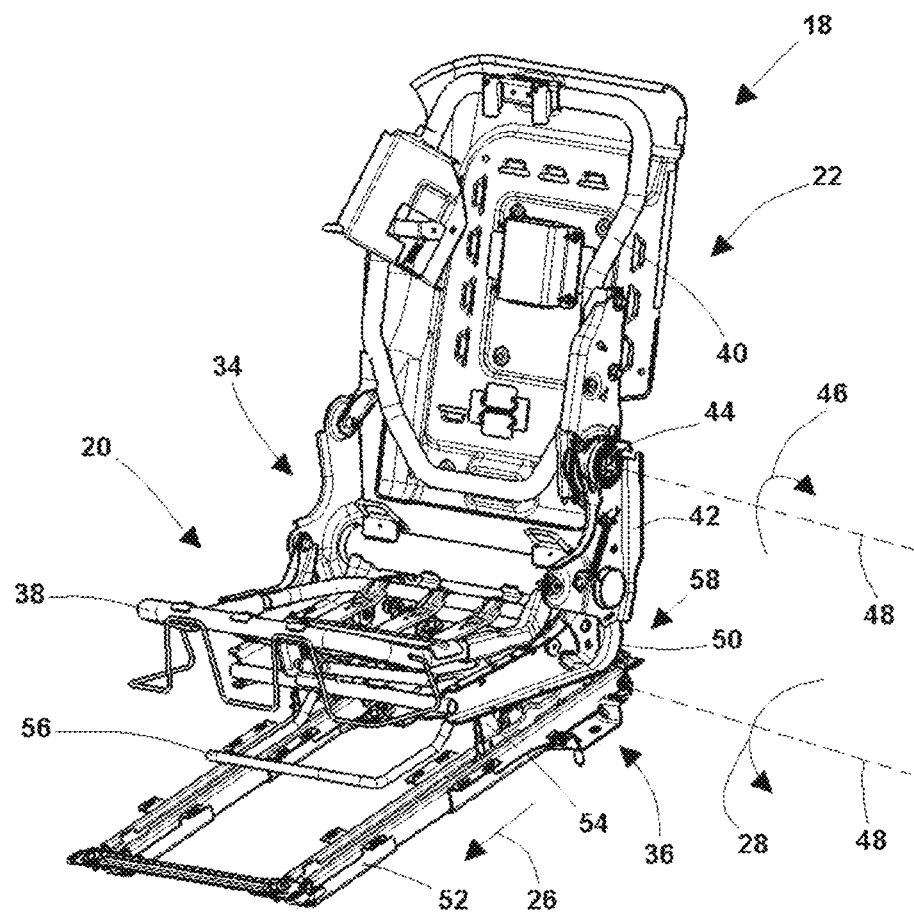
FIG. 3 is a front perspective view of an exemplary seat structure including a seat bottom chassis and a seat back chassis.

FIG. 3 is a front perspective view of an exemplary seat structure 34 including a seat bottom chassis and a seat back chassis. As illustrated, the seat structure 34 is mounted to a track assembly 36. As discussed in detail below, the seat structure 34 is configured to rotate relative to the track assembly 36, and the track assembly 36 is configured to facilitate longitudinal translation of the seat structure 34 along the direction 26. In the present embodiment, the seat structure 34 provides a substantially rigid support for the seat bottom 20 and the seat back 22. In certain configurations, the seat bottom 20 includes a seat bottom chassis 38, one or more cushions, and a fabric covering. The seat bottom chassis 38 serves to support the weight of a passenger during normal vehicle operation and during high g-force events (e.g., rapid acceleration or deceleration, etc.). One or more cushions may be coupled to the seat bottom chassis to provide passenger comfort, and the fabric covering may be disposed about the assembly to provide a desired appearance and/or to protect the internal components of the seat bottom 20. The seat back 22 may be constructed in a similar manner, i.e., from one or more cushions secured to a rigid chassis 40 and wrapped with a fabric covering.

In the present embodiment, the seat back chassis 40 is configured to rotate relative to the seat bottom chassis 38. Accordingly, the seat back chassis 40 is supported by a recliner bracket 42 having a pivot 44. As illustrated, the pivot 44 is configured to enable the seat back chassis 40 to rotate in a rearward direction 46 about a lateral axis 48, thereby facilitating passenger comfort. In certain embodiments, the easy entry mechanism is configured to rotate the seat back chassis 40 in a forward direction relative to the seat bottom chassis 38 to facilitate access to the rear row seat 16. However, such movement may be blocked by the presence of a child safety seat 24 within the second row seat 18. Consequently, the present embodiment employs an easy entry mechanism configured to tilt the seat structure 34 forward while maintaining the angle between the seat bottom chassis 38 and the seat back chassis 40. Such a configuration may facilitate enhanced access to the rear row seat 16, while accommodating the child safety seat 24.

In the present embodiment, the seat structure 34 includes a longitudinal bracket 50 configured to support the seat bottom chassis 38. As discussed in detail below, the longitudinal bracket 50 is pivotally coupled to the track assembly 36 such that the seat structure 34 may rotate in the forward direction 28 about the lateral axis 48. As illustrated, the track assembly 36 includes a pair of tracks 52, a corresponding pair of carriages 54, and a towel bar 56. Each carriage 54 is engaged with a corresponding track 52, and configured to translate along the longitudinal direction 26 to provide passenger comfort. In certain configurations, each carriage 54 includes a pin configured to engage a window within the corresponding track 52, thereby blocking movement of the seat structure 34. To facilitate movement of the seat structure 34, a passenger may rotate the towel bar 56, thereby disengaging the pin from the window and enabling the carriage 54 to translate relative to the track 52. As discussed in detail below, the easy entry mechanism 58 is configured to automatically drive the pin out of the window upon rotation of the seat structure 34, thereby enabling translation of the seat structure 34 without rotation of the towel bar 56.

Figure 4:
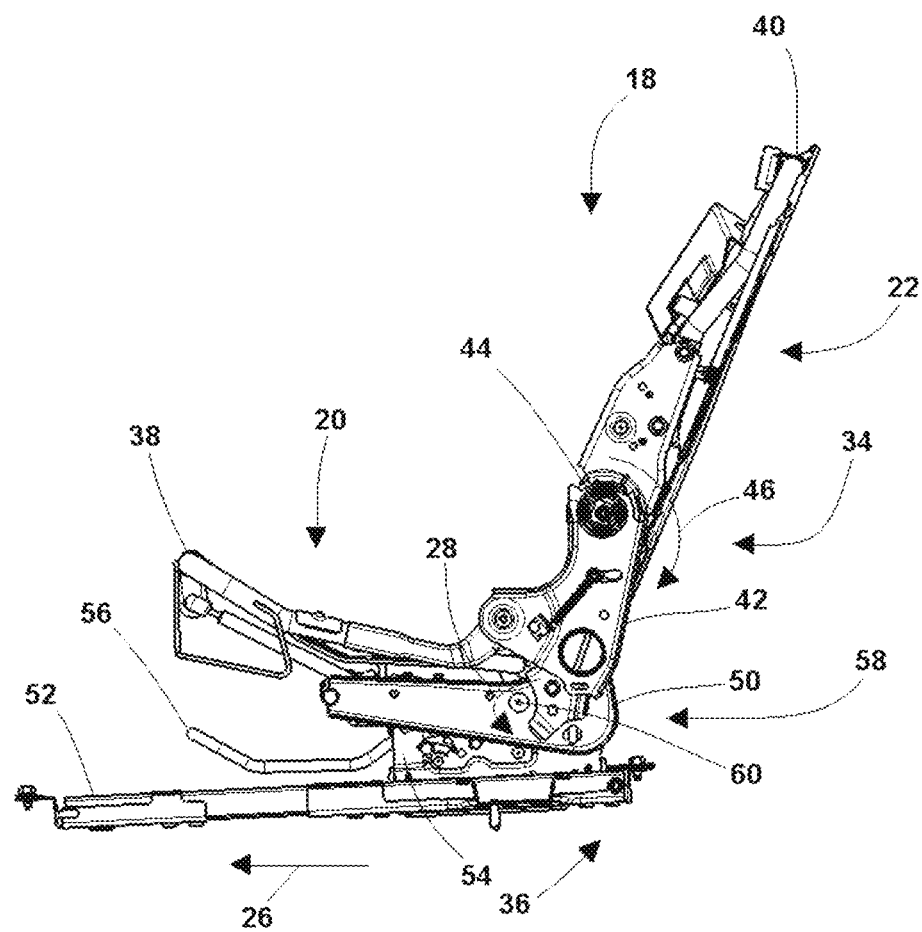
FIG. 4 is a side view of the seat structure shown in FIG. 3, in which the seat structure is oriented in an upright position.

FIG. 4 is a side view of the seat structure 34 shown in FIG. 3, in which the seat structure 34 is oriented in an upright position. As illustrated, the easy entry mechanism 58 includes a pivot 60 configured to facilitate rotation of the seat structure 34 relative to the track assembly 36. Specifically, the pivot 60 serves to pivotally couple the longitudinal bracket 50 to the carriage 54. In such a configuration, activation of the easy entry mechanism 58 will enable the seat structure 34 to rotate in the direction 28 about the lateral axis 48. In addition, rotation of the seat structure 34 will release the pin of each carriage 54 from a respective window within each track 52, thereby enabling the seat structure 34 to translate in the direction 26. Because the angle of the seat back chassis 40 relative to the seat bottom chassis 38 is substantially maintained during rotation of the seat structure 34, the easy entry mechanism 58 enables the seat 18 to accommodate a child safety seat 24 while facilitating access to the rear row seat 16.

Figure 5:
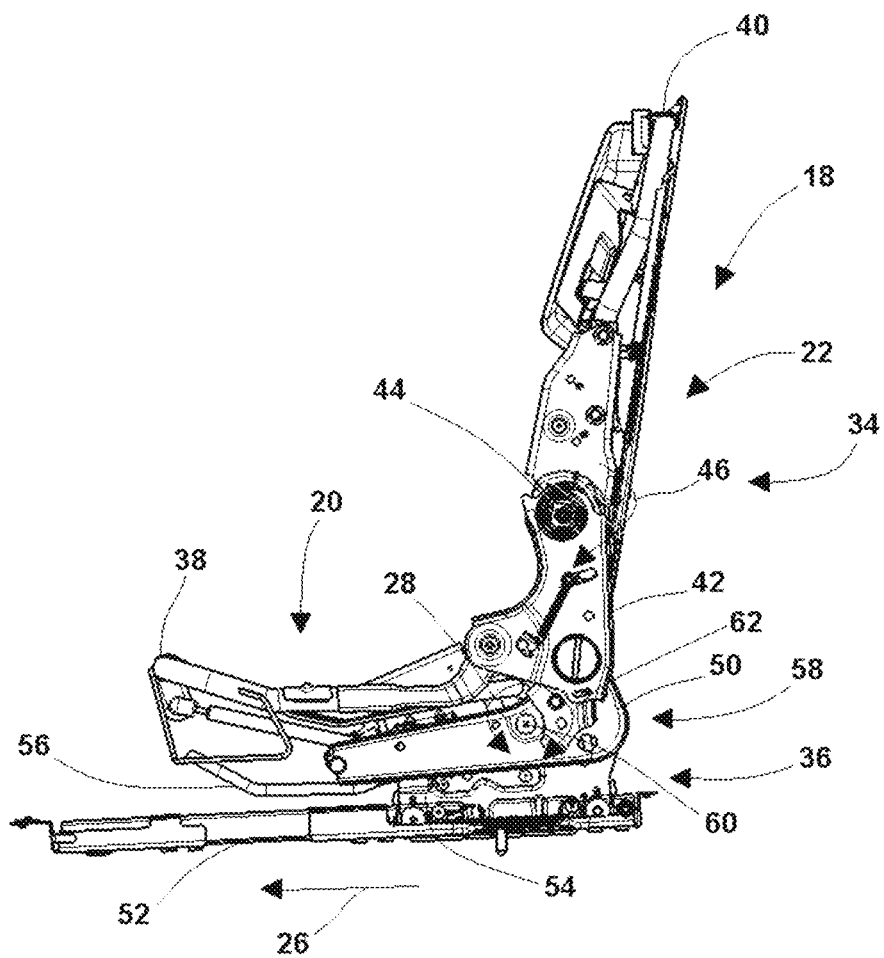
FIG. 5 is a side view of the seat structure shown in FIG. 3, in which the seat structure is rotated into a tilted position.

FIG. 5 is a side view of the seat structure 34 shown in FIG. 3, in which the seat structure 34 is rotated into a tilted position. In the present embodiment, the easy entry mechanism 58 is configured to facilitate an approximately 14 degree rotation of the seat structure 34 relative to the upright position shown in FIG. 4. However, it should be appreciated that alternative configurations may accommodate a larger or smaller degree of rotation. For example, in certain embodiments, the easy entry mechanism 58 may be configured to enable the seat structure 34 to rotate at least 5, 7, 10, 12, 14, 16, 18 or 20 degrees, or more in the direction 28 about the pivot 60. As will be appreciated, a larger angle of rotation may facilitate enhanced access to the rear row seat 16. After a passenger has entered the third row seat 16, the seat structure 34 may be rotated in a rearward direction 62 back to the upright position. In the present embodiment, the easy entry mechanism 58 is configured to automatically lock the seat structure 34 in the upright position as soon as the upright position is reached.

Figure 6:
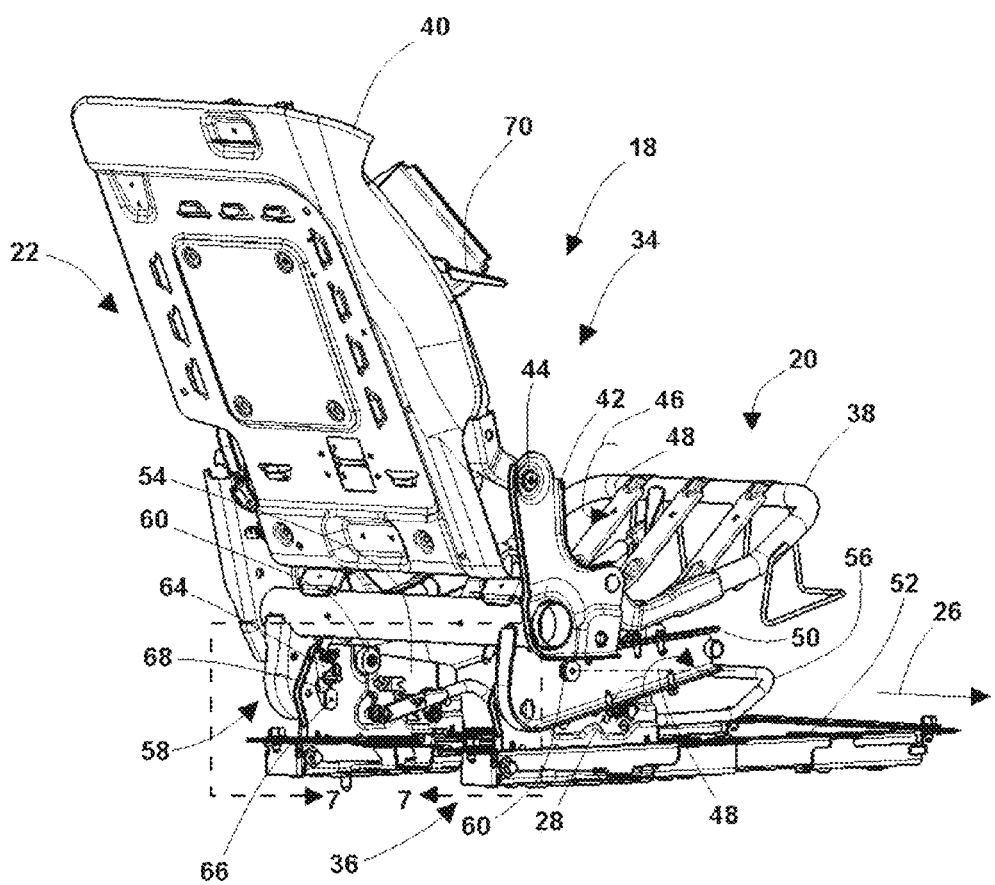
FIG. 6 is a back perspective view of the seat structure shown in FIG. 3, showing an embodiment of the easy entry mechanism.

FIG. 6 is a back perspective view of the seat structure 34 shown in FIG. 3, showing an embodiment of the easy entry mechanism 58. As illustrated, the easy entry mechanism 58 includes a locking mechanism 64 configured to hold the seat structure 34 in the upright position when locked, and to facilitate rotation of the seat structure 34 about the pivot 60 when unlocked. In the illustrated embodiment, the locking mechanism 64 includes a striker pin 66 rigidly coupled to the seat structure 34 and a cam plate 68 pivotally coupled to the carriage 54. The cam plate 68 is configured to selectively block movement of the striker pin 66 to hold the seat structure 34 in the upright position, and to facilitate movement of the striker pin 66 to enable the seat structure 34 to rotate in the forward direction 28 about the lateral axis 48. The easy entry mechanism 58 also includes a release mechanism 70 coupled to the locking mechanism 64 (e.g., via a cable) and configured to enable the seat structure 34 to rotate upon activation. In this configuration, a passenger may activate the release mechanism 70 to facilitate rotation of the seat structure 34 in the forward direction 28 and translation of the seat structure 34 in the longitudinal direction 26, thereby providing enhanced access to the rear row seat 16. While the release mechanism 70 of the present embodiment includes a handle coupled to the seat back chassis 40, it should be appreciated that alternative embodiments may include other release mechanism actuators located within other areas of the second row seat 18.

Figure 7:
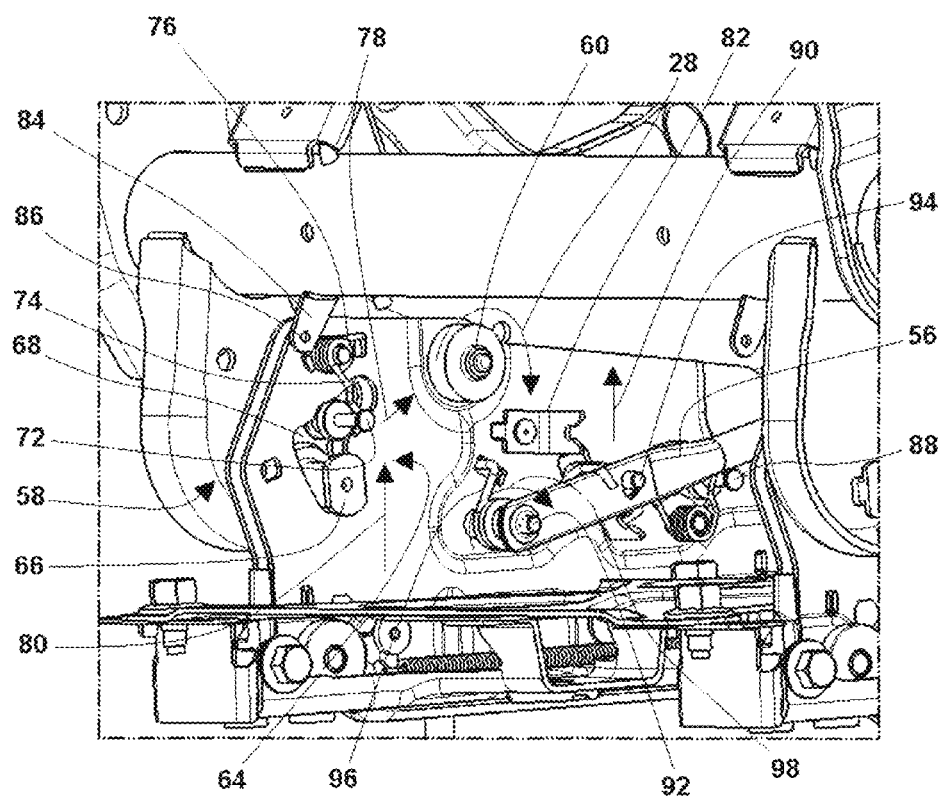
FIG. 7 is a detailed perspective view of the seat structure, taken within line 7-7 of FIG. 6.

FIG. 7 is a detailed perspective view of the seat structure 34, taken within line 7-7 of FIG. 6. As previously discussed, the locking mechanism 64 includes a striker pin 66 and a cam plate 68 configured to selectively block and enable rotation of the seat structure 34. In the present embodiment, the cam plate 68 includes a pin 72 configured to drive the cam plate 68 to rotate. The pin 72 is biased into the illustrated rearward position by a torsion spring 74 coupled to a mount 76 on the carriage 54. In this configuration, the torsion spring 74 drives the cam plate 68 to a position that blocks movement of the striker pin 66, thereby holding the seat structure 34 in the upright position. By applying a force to the pin 72 in the direction 78 sufficient to overcome the spring bias, the cam plate 68 may be driven to disengage the striker pin 66. For example, a cable may extend between the release mechanism 70 and the pin 72. As the release mechanism 70 is actuated, the cable will drive the pin 72 in the direction 78, thereby releasing the striker pin 66. With the cam plate 68 disengaged from the striker pin 66, the striker pin 66 may translate in the direction 80, thereby enabling the seat structure 34 to rotate in the direction 28.

As previously discussed, rotation of the seat structure 34 in the direction 28 will induce a pin of the carriage 54 to disengage a window of the track 52, thereby enabling the seat structure 34 to translate in the direction 26. In the present embodiment, the carriage 54 includes a bracket 82 configured to support a cable (not shown) extending to a mount 84 of the seat structure 34. Specifically, one end of the cable may be attached to an opening 86 within the mount 84, and the other end of the cable may be secured to a pin 88. As the seat structure 34 rotates in the direction 28 relative to the carriage 54, the cable will drive the pin 88 toward the rear of the seat 18, thereby inducing the pin to disengage the window. As a result, rotation of the seat structure 34 automatically unlocks each carriage 54 from the corresponding track 52, thereby enabling translation of the seat structure 34 in the direction 26. Consequently, activation of the release mechanism 70 facilitates rotation and translation of the seat structure 34, thereby enabling enhanced access to the rear row seat 16.

As previously discussed, the carriages 54 may be manually unlocked from the tracks 52 via rotation of the towel bar 56 in the direction 90. As illustrated, the towel bar 56 is rotationally coupled to the carriage 54 by a pin 92. Rotation of the towel bar 56 drives an actuator 94 in the direction 90, thereby inducing the pin of the carriage 54 to disengage the window of the track 52. To hold the towel bar 56 in the illustrated lowered position, a torsion spring 96 is disposed about the pin 92 and configured to bias the towel bar 56 in the direction 98. Such a configuration may substantially reduce or eliminate the possibility of unintentional rotation of the towel bar 56 due to movement of the vehicle 10. As discussed in detail below, when a passenger releases the towel bar 56, a torsion spring will induce rotation of a locking structure, thereby driving the pin to reengage the window and blocking movement of the seat structure 34 in the longitudinal direction 26.

Figure 8:
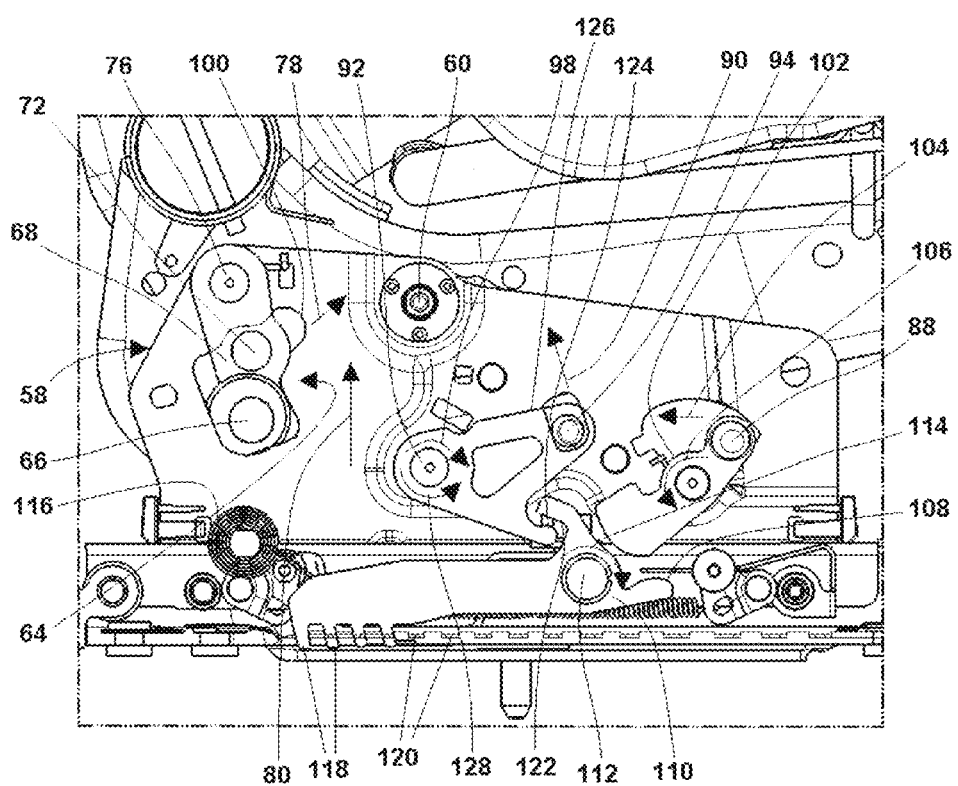
FIG. 8 is a cross-sectional side view of the easy entry mechanism shown in FIG. 6, in which the seat structure is oriented in an upright position.

FIG. 8 is a cross-sectional side view of the easy entry mechanism 58 shown in FIG. 6, in which the seat structure 34 is oriented in an upright position. As previously discussed, contact between the cam plate 68 and the striker pin 66 blocks rotation of the seat structure 34 about the pivot 60. However, once the cam plate 68 is driven in the direction 78 by the pin 72, the cam plate 68 will disengage the striker pin 66, thereby enabling the striker pin 66 to translate in the direction 80 within the slot 100. Because the striker pin 66 is coupled to the longitudinal bracket 50, rotation of the seat structure 34 in the direction 28 will induce the striker pin 66 to translate in the direction 80.

As previously discussed, rotation of the seat structure 34 in the direction 28 automatically induces the pin within the carriage 54 to disengage the window of the track 52, thereby enabling the seat structure 34 to translate in the direction 26. Specifically, the pin 88 of the carriage 54 is coupled to a cam 102 configured to drive each pin out of a corresponding window when the seat structure 34 is rotated forward. As illustrated, movement of the pin 88 in the direction 104 will induce the cam 102 to rotate in the direction 106. As a result, the cam 102 will contact a protrusion 108 of a locking structure 110. In the present embodiment, the locking structure 110 is rotatably secured to the carriage 54 by a pivot 112. Accordingly, contact between the cam 102 and the protrusion 108 will drive the locking structure 110 to rotate in a direction 114 about the pivot 112. As illustrated, a torsion spring 116 is in contact with the locking structure 110 and configured to bias the pins 118 into corresponding windows 120 of the track 52. Consequently, while the cam 102 is in the illustrated disengaged position, the torsion spring 116 will hold the pins 118 in the windows 120, thereby blocking longitudinal movement of the seat structure 34. However, when the cable drives the cam 102 to rotate in the direction 106, contact between the cam 102 and the protrusion 108 will drive the locking structure 110 to rotate in the direction 114, thereby inducing the pins 118 to disengage the windows 120. As a result, rotation of the seat structure 34 in the direction 28 will automatically enable translation of the seat structure 34 in the direction 26.

In addition, the locking structure 110 may be operated manually via rotation of the towel bar 56. As previously discussed, movement of the actuator 94 in the direction 90 will induce the pins 118 to disengage the windows 120. Specifically, the locking structure 110 includes a second protrusion 122 configured to engage an extension 124 of an actuator assembly 126. As illustrated, the actuator 94 is coupled to the actuator assembly 126. Consequently, movement of the actuator 94 in the direction 90 will induce the actuator assembly 126 to rotate in the direction 128. Contact between the extension 124 and the second protrusion 122 will drive the locking structure 110 to rotate in the direction 114, thereby extracting the pins 118 from the windows 120 and enabling the seat structure 34 to translate in the longitudinal direction 26 along the tracks 52.

Figure 9:
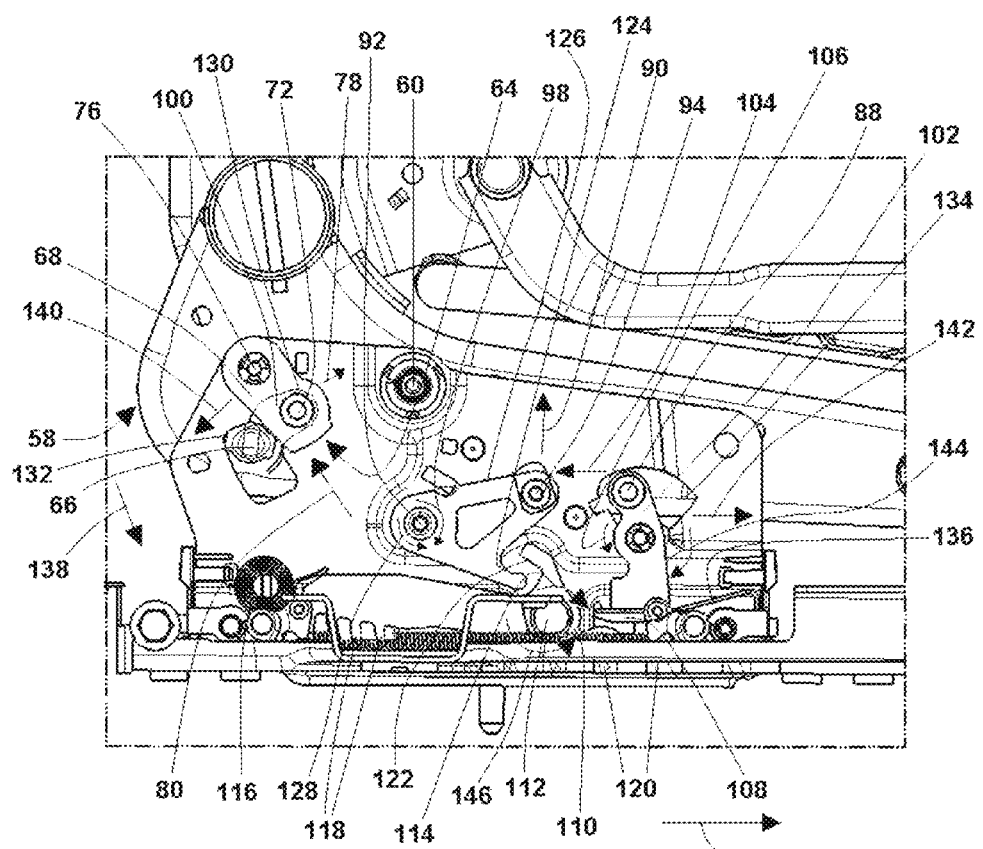
FIG. 9 is a cross-sectional side view of the easy entry mechanism shown in FIG. 6, in which the seat structure is rotated into a tilted position.

FIG. 9 is a cross-sectional side view of the easy entry mechanism 58 shown in FIG. 6, in which the seat structure 34 is rotated into a tilted position. As illustrated, the cam plate 68 has been rotated about the mount 76, thereby enabling the striker pin 66 to move in the direction 80 as the seat structure 34 rotates about the pivot 60. In the present embodiment, the slot 100 includes an extension 130 configured to accommodate movement of the pin 72 as the cam plate 68 rotates. In addition, the slot 100 includes a notch 132 configured to block movement of the striker pin 66 in the direction 80. Specifically, movement of the striker pin 66 is blocked by contact with the notch 132 and the cam plate 68, thereby limiting rotation of the seat structure 34 about the pivot 60. For example, the slot 100 may be configured to limit rotation of the seat structure 34 to 14 degrees.

Furthermore, the cam 102 has been rotated in the direction 106 due to movement of the pin 88 in the direction 104. As illustrated, a slot 134 is configured to facilitate movement of the pin 88 as rotation of the seat structure 34 induces the cable to drive the pin 88 in the direction 104. In the present embodiment, rotation of the cam 102 induces a spring plate 136 to deform, thereby driving the locking structure 110 to rotate in the direction 114. As previously discussed, rotation of the locking structure 110 drives the pins 118 to disengage the windows 120, thereby enabling movement of the seat structure 34 in the direction 26. It should be noted that movement of the locking structure 110 due to rotation of the seat structure 34 does not induce the towel bar 56 to rotate. As illustrated, rotation of the locking structure 110 in the direction 114 establishes a gap between the extension 124 and the protrusion 122. In other words, rotation of the locking structure 110 does not induce the actuator assembly 126 to rotate. Consequently, the towel bar 56 will remain in the lowered position, thereby substantially reducing or eliminating the possibility of contact between the seat bottom chassis 38 and the towel bar 56 during rotation of the seat structure 34.

After the passenger has entered the rear row seat 16, the seat structure 34 may be manually rotated back to the upright position. As the seat is rotated toward the upright position, the striker pin 66 will be driven in the direction 138. Due to the bias applied to the pin 72 by the spring 74, the cam plate 68 will be driven in the direction 140 back to the locked position illustrated in FIG. 8. In addition, as the seat structure 34 rotates toward the upright position, the pin 88 will be driven in the direction 142 due to a torsion spring (not shown) biasing the cam 102 in the direction 144. As the cam 102 rotates in the direction 144, the cam 102 will disengage the protrusion 108, thereby enabling the spring 116 to rotate the locking structure 110 in the direction 146. As a result, the pins 118 will reengage the windows 120, thereby blocking movement of the seat structure 34 relative to the tracks 52.

Figure 10:
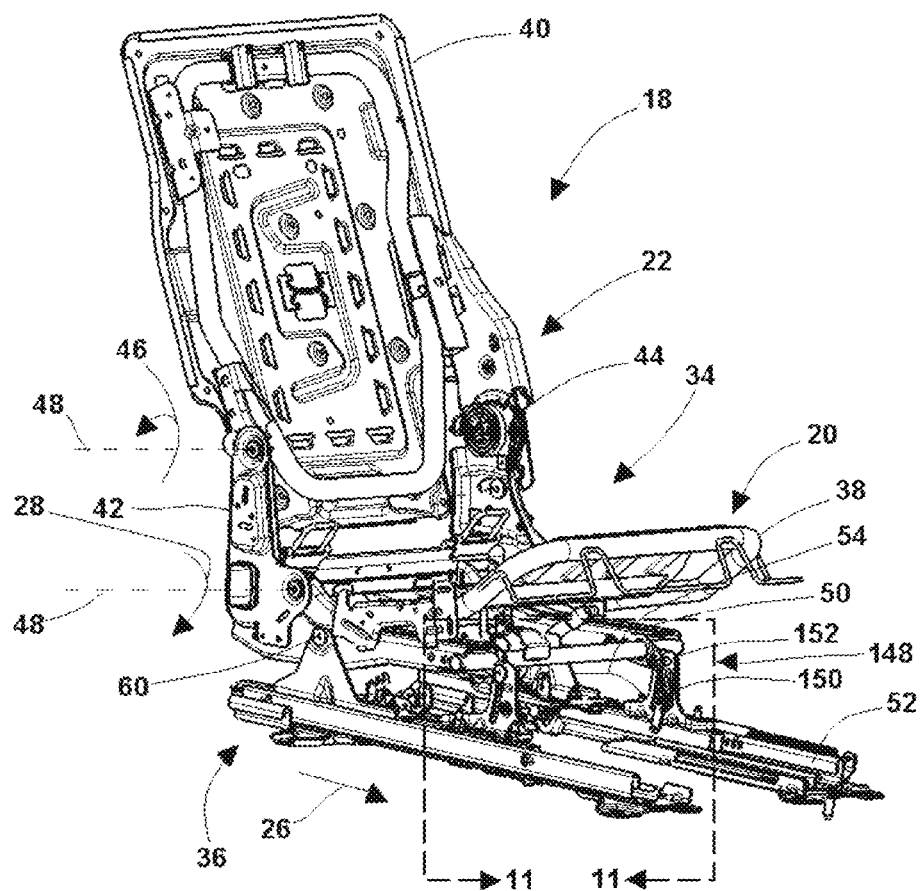
FIG. 10 is a perspective view of an exemplary seat structure including an alternative embodiment of the easy entry mechanism.

FIG. 10 is a perspective view of an exemplary seat structure including an alternative embodiment of the easy entry mechanism 148. As discussed in detail below, the easy entry mechanism 148 includes a striker pin 150 and a finger 152. The finger 152 is configured to selectively block movement of the striker pin 150 to hold the seat structure 34 in an upright position, and to facilitate movement of the striker pin 150 to enable the rotation of the seat structure 34. In the present embodiment, the finger 152 and striker pin 150 are positioned forward of the pivot 60 along the longitudinal direction 26.

Figure 11:
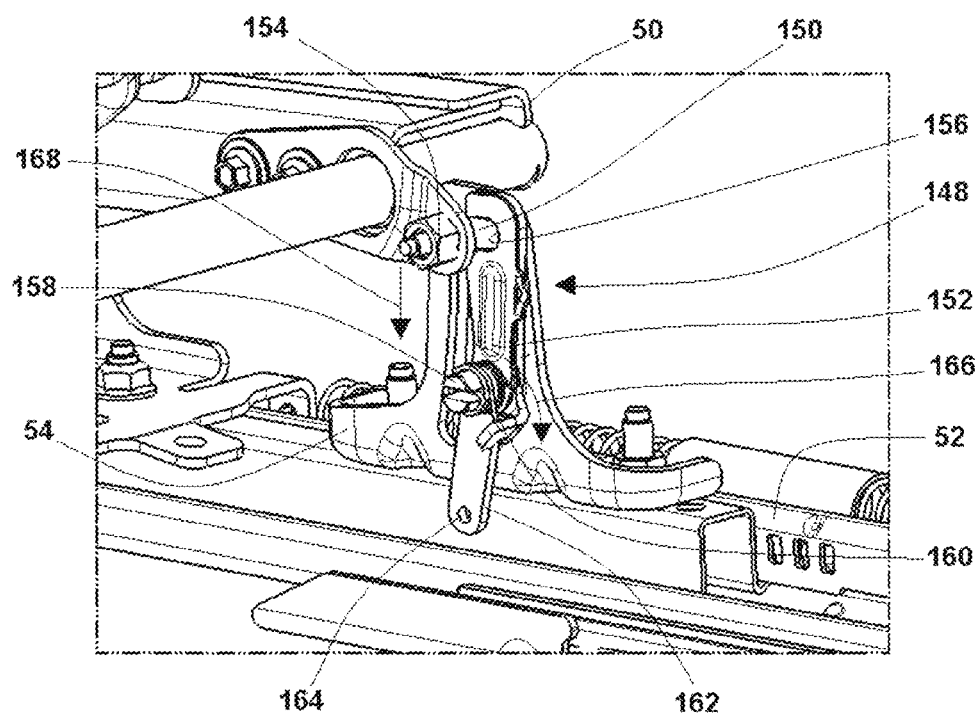
FIG. 11 is a detailed perspective view of the seat structure, taken within line 11-11 of FIG. 10.

FIG. 11 is a detailed perspective view of the seat structure 34, taken within line 11-11 of FIG. 10. As illustrated, the striker pin 150 is secured to the longitudinal bracket 50 by a fastener 154. In addition, the finger 152 includes a notch 156 configured to engage the pin 150, thereby locking the seat structure 34 in the illustrated upright position. The easy entry mechanism 148 also includes a pivot 158 configured to facilitate rotation of the finger 152, and a spring 160 configured to rotationally bias the finger 152 into the illustrated locked position. In the present embodiment, the finger 152 includes an extension 162 having an opening 164 at one end. In certain embodiments, a cable may be coupled to the opening 164 and extend to the release mechanism 70. In such embodiments, actuation of the release mechanism 70 will drive the finger 152 to rotate in the direction 166, thereby causing the notch 156 to disengage the striker pin 150. As a result, the striker pin 150 may translate in the direction 168, thereby enabling the seat structure 34 to rotate in the direction 28. Similar to the easy entry mechanism 58 described above, rotation of the seat structure 34 will automatically release the pins 118 of the carriage 54 from the windows 120 of the track 52, thereby enabling translation of the seat structure 34 in the longitudinal direction 26. Due to the rotational bias induced by the spring 160, the notch 156 will automatically reengage the striker pin 150 as the seat structure 34 is rotated back to the upright position, thereby locking the seat structure 34 in the upright position.

Figure 12:
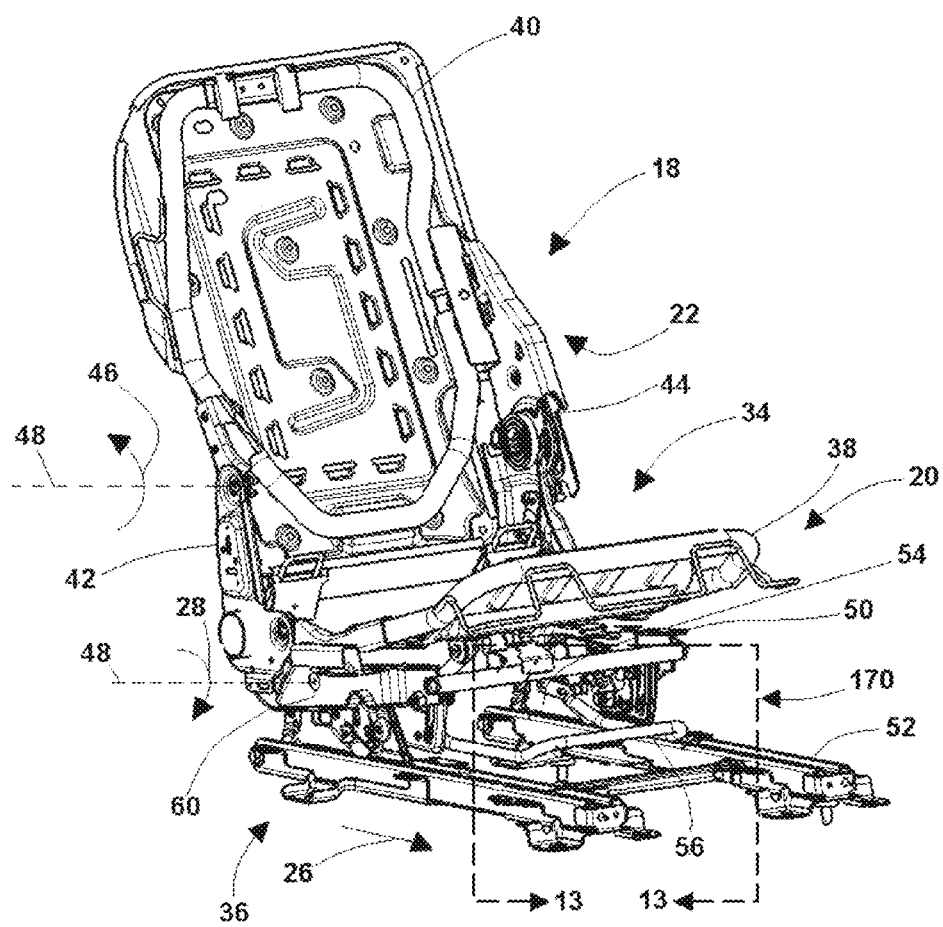
FIG. 12 is a perspective view of an exemplary seat structure including another alternative embodiment of the easy entry mechanism.

FIG. 12 is a perspective view of an exemplary seat structure 34 including another alternative embodiment of the easy entry mechanism 170. Similar to the easy entry mechanism 58 described above with reference to FIGS. 3-9, the easy entry mechanism 170 includes a striker pin and a cam plate. The cam plate is configured to selectively block movement of the striker pin to hold the seat structure 34 in an upright position, and to facilitate movement of the striker pin to enable the rotation of the seat structure 34. In the present embodiment, the cam plate and striker pin are positioned forward of the pivot 60 along the longitudinal direction 26.

Figure 13:
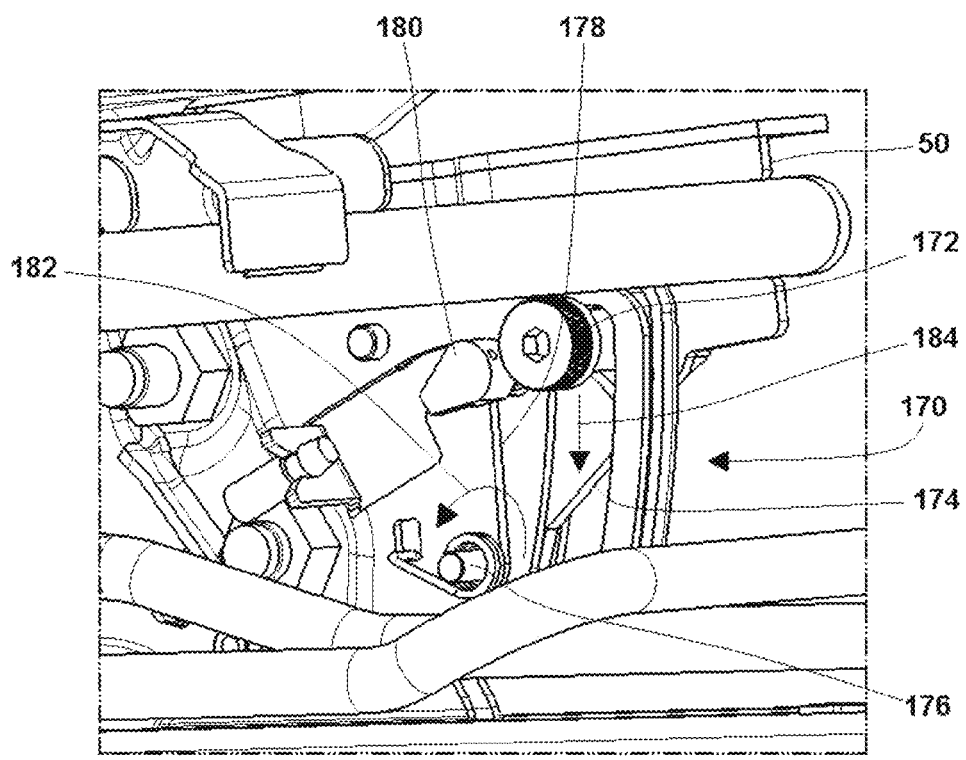
FIG. 13 is a detailed perspective view of the seat structure, taken within line 13-13 of FIG. 12.

FIG. 13 is a detailed perspective view of the seat structure 34, taken within line 13-13 of FIG. 12. As illustrated, the striker pin 172 is secured to the longitudinal bracket 50, and the cam plate 174 is rotationally coupled to the carriage 54. In the illustrated configuration, movement of the striker pin 172 is block by contact with the cam plate 174, thereby locking the seat structure 34 into the upright position. The easy entry mechanism 170 includes a pivot 176 configured to facilitate rotation of the cam plate 174, and a spring 178 configured to rotationally bias the cam plate 174 into the illustrated locked position. In the present embodiment, a connector 180 is coupled to the cam plate 174 by a pin, for example. In certain embodiments, a cable may be coupled to the connector 180 and extend to the release mechanism 70. In such embodiments, actuation of the release mechanism 70 will drive the cam plate 174 to rotate in the direction 182, thereby causing the cam plate 174 to disengage the striker pin 172. As a result, the striker pin 172 may translate in the direction 184, thereby enabling the seat structure 34 to rotate in the direction 28. Similar to the easy entry mechanism 58 described above, rotation of the seat structure 34 will automatically release the pins 118 of the carriage 54 from the windows 120 of the track 52, thereby enabling translation of the seat structure 34 in the longitudinal direction 26. Due to the rotational bias induced by the spring 178, the cam plate 174 will automatically reengage the striker pin 172 as the seat structure 34 is rotated back to the upright position, thereby locking the seat structure 34 in the upright position.

Figure 14:
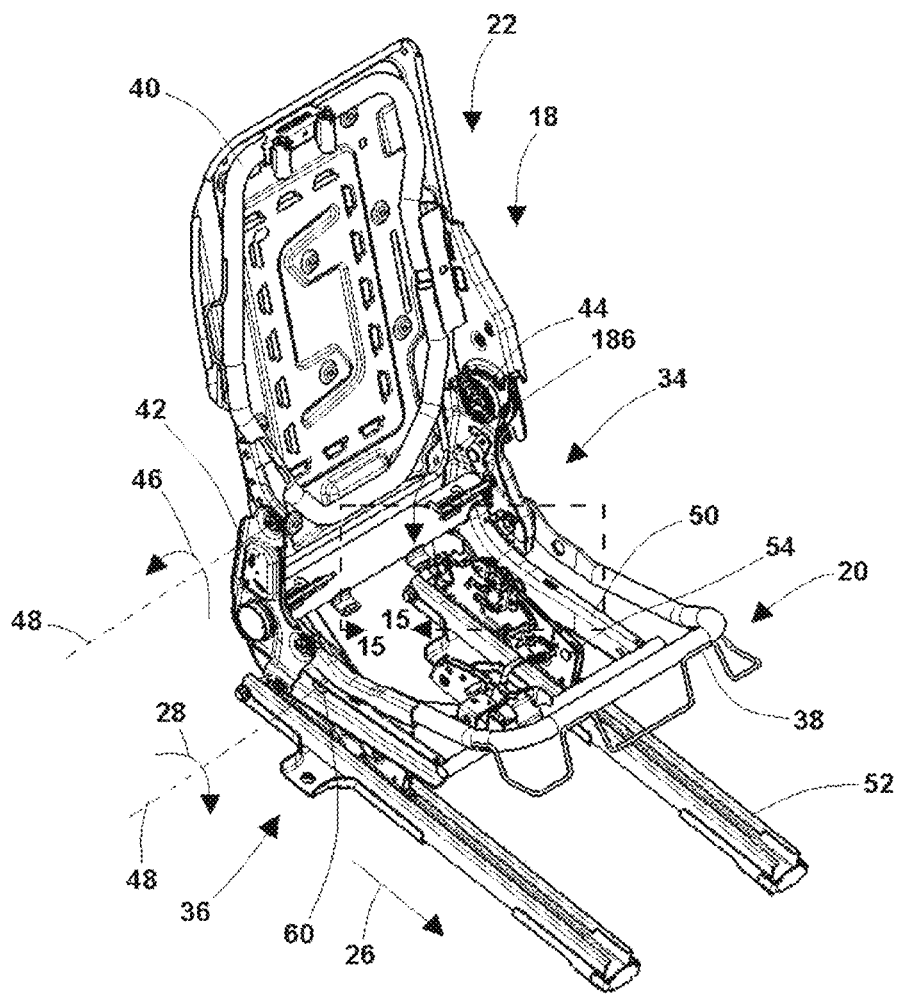
FIG. 14 is a perspective view of an exemplary seat structure including a further alternative embodiment of the easy entry mechanism.

FIG. 14 is a perspective view of an exemplary seat structure 34 including a further alternative embodiment of the easy entry mechanism 186. As discussed in detail below, the easy entry mechanism 186 includes a striker pin and a finger. The finger is configured to selectively block movement of the striker pin to hold the seat structure 34 in an upright position, and to facilitate movement of the striker pin to enable the rotation of the seat structure 34. In the present embodiment, the finger and striker pin are positioned rearward of the pivot 60 along the longitudinal direction 26.

Figure 15:
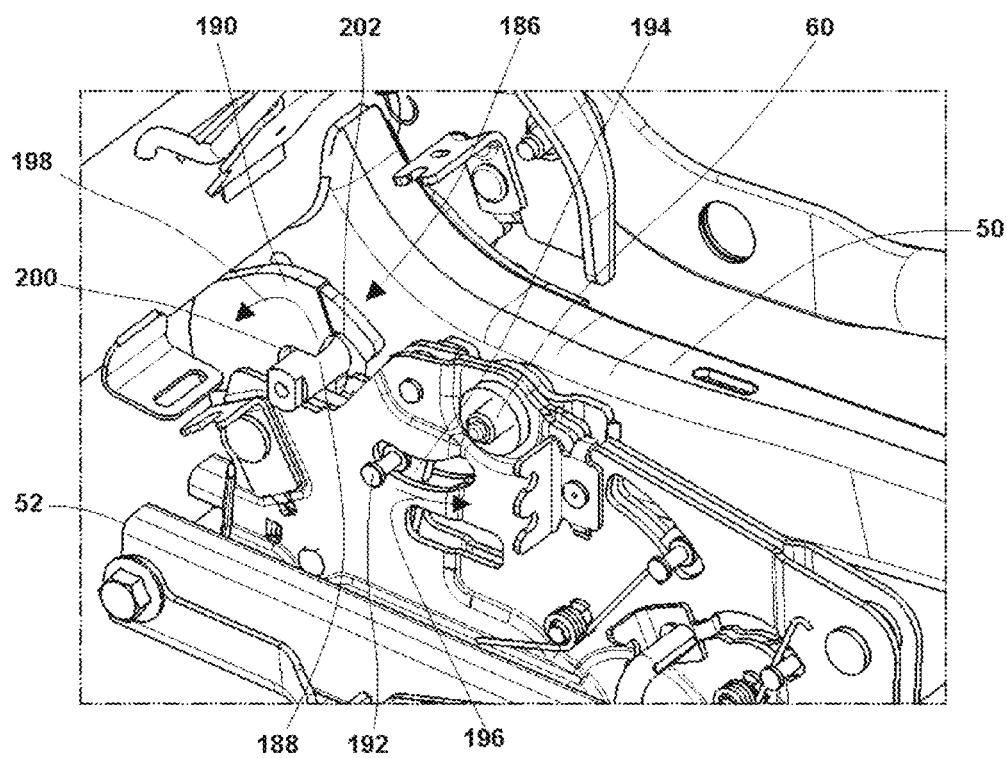
FIG. 15 is a detailed perspective view of the seat structure, taken within line 15-15 of FIG. 14.

FIG. 15 is a detailed perspective view of the seat structure 34, taken within line 15-15 of FIG. 14. As illustrated, the striker pin 188 is secured to the longitudinal bracket 50, and the finger 190 is rotationally coupled to the carriage 54. In addition, the easy entry mechanism 186 includes a pin 192 coupled to a cam plate 194. In certain embodiments, a cable may be coupled to the pin 192 and extend to the release mechanism 70. In such embodiments, actuation of the release mechanism 70 will drive the cam plate 194 to rotate in the direction 196, thereby enabling the finger 190 to rotate in the direction 198. As the finger 190 rotates, the striker pin 188 will disengage a first notch 200, thereby enabling the seat structure 34 to rotate in the direction 28. In addition, the finger 190 includes a second notch 202 configured to limit movement of the striker pin 188, thereby limiting the rotation of the seat structure 34 about the pivot 60. Similar to the easy entry mechanism 58 described above, rotation of the seat structure 34 will automatically release the pins 118 of the carriage 54 from the windows 120 of the track 52, thereby enabling translation of the seat structure 34 in the longitudinal direction 26. Due to a rotational bias on the finger 190, the notch 200 will automatically reengage the striker pin 188 as the seat structure 34 is rotated back to the upright position, thereby locking the seat structure 34 in the upright position.

FIG. 16 is a perspective view of a portion of an exemplary seat structure 34 including an embodiment of a stabilizing support. In the illustrated embodiment, the stabilizing support includes a crossbar stabilizer 204 extending between the longitudinal brackets 50. Specifically, the crossbar stabilizer 204 is secured to each longitudinal bracket 50 (e.g., via a welded connection, fasteners, etc.) adjacent to the pivot 60, thereby enhancing the structural rigidity of the seat structure 34. Consequently, the crossbar stabilizer 204 maintains the orientation of the longitudinal brackets 50 as the seat structure 34 translates along the tracks 52. As a result, alignment between the carriages 54 and the tracks 52 will be enhanced, thereby reducing the force associated with seat translation. In addition, when the seat structure 34 rotates in the forward direction 28 or the rearward direction 62, the crossbar stabilizer 204 reduces structural flexing that may otherwise interfere with seat rotation. While a crossbar stabilizer 204 is employed in the illustrated embodiment, it should be appreciated that alternative embodiments may include other stabilizing supports, such as a truss structure or a plate stabilizer, for example.

While only certain features and embodiments of the invention have been illustrated and described, many modifications and changes may occur to those skilled in the art (e.g., variations in sizes, dimensions, structures, shapes and proportions of the various elements, values of parameters (e.g., temperatures, pressures, etc.), mounting arrangements, use of materials, colors, orientations, etc.) without materially departing from the novel teachings and advantages of the subject matter recited in the claims. The order or sequence of any process or method steps may be varied or re-sequenced according to alternative embodiments. It is, therefore, to be understood that the appended claims are intended to cover all such modifications and changes as fall within the true spirit of the invention. Furthermore, in an effort to provide a concise description of the exemplary embodiments, all features of an actual implementation may not have been described (i.e., those unrelated to the presently contemplated best mode of carrying out the invention, or those unrelated to enabling the claimed invention). It should be appreciated that in the development of any such actual implementation, as in any engineering or design project, numerous implementation specific decisions may be made. Such a development effort might be complex and time consuming, but would nevertheless be a routine undertaking of design, fabrication, and manufacture for those of ordinary skill having the benefit of this disclosure, without undue experimentation.

The invention claimed is:

1. A vehicle seating system, comprising:
a seat bottom chassis;
a seat back chassis coupled to the seat bottom chassis; and
an easy entry mechanism configured to facilitate forward rotation of the seat bottom chassis and the seat back chassis about a lateral axis of the vehicle seating system, wherein the easy entry mechanism is configured to maintain a substantially constant angle between the seat bottom chassis and the seat back chassis during the rotation, the easy entry mechanism comprises a striker pin, the striker pin is configured to block the forward rotation of the seat bottom chassis and the seat back chassis from an upright position to a tilted position via contact with a first surface, the first surface is selectively movable to facilitate the forward rotation of the seat bottom chassis and the seat back chassis from the upright position to the tilted position, and the striker pin is configured to block the forward rotation of the seat bottom chassis and the seat back chassis from the tilted position via contact with a second surface, different from the first surface.

2. The vehicle seating system of claim 1, wherein the easy entry mechanism comprises a release mechanism configured to enable the forward rotation.

3. The vehicle seating system of claim 1, wherein the seat back chassis is configured to pivot relative to the seat bottom chassis independently of the forward rotation.

4. The vehicle seating system of claim 1, wherein the easy entry mechanism is configured to facilitate a longitudinal translation of the seat bottom chassis along a track.

5. The vehicle seating system of claim 4, wherein the forward rotation drives a pin to disengage a window of the track to enable the longitudinal translation.

6. The vehicle seating system of claim 1, wherein the easy entry mechanism comprises a cam plate having the first surface.

7. The vehicle seating system of claim 6, wherein the easy entry mechanism comprises a pivot configured to facilitate the forward rotation, and wherein the cam plate and the striker pin are positioned longitudinally rearward of the pivot.

8. The vehicle seating system of claim 1, wherein the easy entry mechanism comprises a finger having the first surface.

9. The vehicle seating system of claim 8, wherein the easy entry mechanism comprises a pivot configured to facilitate the forward rotation, and wherein the finger and the striker pin are positioned longitudinally rearward of the pivot.

10. A vehicle seating system, comprising:
a track oriented in a longitudinal direction;
a carriage engaged with the track and configured to translate along the longitudinal direction;
a seat structure comprising a seat bottom chassis and a seat back chassis, wherein the seat structure is pivotally coupled to the carriage to facilitate rotation of the seat structure about a lateral axis relative to the carriage; and
a locking mechanism configured to selectively hold the seat structure in a first position relative to the carriage and to facilitate forward rotation of the seat structure between the first position and a second position relative to the carriage, wherein the locking mechanism comprises a striker pin, the striker pin is configured to block the forward rotation of the seat structure from the first position to the second position via contact with a first surface, the first surface is selectively movable to facilitate the forward rotation of the seat structure from the first position to the second position, and the striker pin is configured to block the forward rotation of the seat structure from the second position via contact with a second surface, different from the first surface.

11. The vehicle seating system of claim 10, wherein the track comprises a plurality of windows positioned along the longitudinal direction, the carriage comprises a pin configured to selectively engage one of the plurality of windows to block translation of the carriage relative to the track, and the vehicle seating system is configured to drive the pin out of the window when the seat structure is rotated to the second position.

12. The vehicle seating system of claim 10, wherein the locking mechanism comprises a cam plate pivotally coupled to the carriage and having the first surface, and the striker pin is rigidly coupled to the seat structure.

13. The vehicle seating system of claim 10, wherein the locking mechanism comprises a finger pivotally coupled to the carriage and having the first surface, and the striker pin is rigidly coupled to the seat structure.

14. The vehicle seating system of claim 10, comprising a release mechanism coupled to the locking mechanism and configured to enable the seat structure to rotate between the first position and the second position upon activation.

15. A vehicle seating system, comprising:
a track oriented in a longitudinal direction and comprising a plurality of windows positioned along the longitudinal direction;
a carriage engaged with the track and configured to translate along the longitudinal direction, wherein the carriage comprises a pin configured to selectively engage one of the plurality of windows to block translation of the carriage relative to the track;
a seat structure comprising a seat bottom chassis and a seat back chassis; and
an easy entry mechanism comprising a pivot configured to facilitate rotation of the seat structure about a lateral axis relative to the carriage, a locking mechanism configured to selectively hold the seat structure in a first position relative to the carriage and to facilitate forward rotation of the seat structure between the first position and a second position relative to the carriage when the locking mechanism is released, and a cam configured to drive the pin out of the window when the seat structure is rotated to the second position;
wherein the locking mechanism comprises a striker pin, the striker pin is configured to block the forward rotation of the seat structure from the first position to the second position via contact with a first surface, the first surface is selectively movable to facilitate the forward rotation of the seat structure from the first position to the second position, and the striker pin is configured to block the forward rotation of the seat structure from the second position via contact with a second surface, different from the first surface.

16. The vehicle seating system of claim 15, wherein the seat structure comprises a stabilizing support positioned adjacent to the pivot, and configured to enhance structural rigidity of the seat structure.

17. The vehicle seating system of claim 15, wherein the locking mechanism comprises a cam plate pivotally coupled to the carriage and having the first surface, and the striker pin is rigidly coupled to the seat structure.

18. The vehicle seating system of claim 17, wherein the cam plate and the striker pin are positioned longitudinally rearward of the pivot.

19. The vehicle seating system of claim 15, wherein the locking mechanism comprises a finger pivotally coupled to the carriage and having the first surface, and the striker pin is rigidly coupled to the seat structure.

20. The vehicle seating system of claim 19, wherein the finger and the striker pin are positioned longitudinally rearward of the pivot.

* * * * *